(12) United States Patent
Ogirko et al.

(10) Patent No.: US 12,360,634 B1
(45) Date of Patent: Jul. 15, 2025

(54) SIGNAL PROCESSING UNIT OF CAPACITIVE TOUCH SENSING CHANNEL

(71) Applicant: Cypress Semiconductor Corporation, San Jose, CA (US)

(72) Inventors: Roman Ogirko, Lviv (UA); Syed Tabish Alam, Cork (IE)

(73) Assignee: Cypress Semiconductor Corporation, San Jose, CA (US)

(*) Notice: Subject to any disclaimer, the term of this patent is extended or adjusted under 35 U.S.C. 154(b) by 0 days.

(21) Appl. No.: 18/668,460

(22) Filed: May 20, 2024

(51) Int. Cl.
*G06F 3/041* (2006.01)
*G06F 3/044* (2006.01)

(52) U.S. Cl.
CPC ...... *G06F 3/0418* (2013.01); *G06F 3/041662* (2019.05); *G06F 3/0446* (2019.05)

(58) Field of Classification Search
CPC .. G06F 3/0418; G06F 3/041662; G06F 3/044; G06F 3/0446
See application file for complete search history.

(56) References Cited

U.S. PATENT DOCUMENTS

| 12,159,007 | B1* | 12/2024 | Huang | G06F 3/04182 |
| 2018/0113534 | A1* | 4/2018 | Tanaka | G06F 3/04166 |
| 2021/0226626 | A1* | 7/2021 | Ogirko | G06F 3/04182 |

* cited by examiner

*Primary Examiner* — Hong Zhou (57) ABSTRACT

An integrated circuit includes a sigma-delta modulator (SDM) coupled to a receive electrode, which is selectively coupled to multiple unit cell sensors. A demodulator is coupled directly to the SDM, the demodulator to generate a multibit digital signal by demodulating a digital pulse density modulated (PDM) signal received from the SDM. The demodulating can include multiplying digitized cosine values with the digital PDM signal. A cascaded integrator-comb (CIC) filter is coupled to the demodulator and includes a first integrator and a second integrator cascaded together and to accumulate, at the second integrator, a plurality of samples of the multibit digital signal. The CIC filter includes a single comb circuit coupled to the second integrator, the single comb circuit to generate a measured amplitude bitstream from the accumulated samples.

21 Claims, 11 Drawing Sheets

SIGNAL PROCESSING UNIT OF CAPACITIVE TOUCH SENSING CHANNEL

BACKGROUND

Devices and systems, such as mobile communications devices, can include various sensing devices such as touchscreens (e.g., touch panels) and buttons. The touchscreens and buttons can utilize one or more sensing modalities to receive the inputs from an entity, such as from a user of a mobile communications device. An example of such a modality can include capacitive (or other) sensing in which a touchscreen or button can include conductive elements, which can be used to obtain measures of various capacitances (or other parameters).

For example, a touch panel sensor can include an array of electrodes and a touchscreen controller can be used to measure capacitances (or other phenomena) associated with those electrodes. The automotive touch sensing applications require high-sensitivity to support thick overlay, operation with gloved hand, and operation at noisy conditions generated by a display screen. Meeting these requirements can be especially challenging if sensing is performed on a unit cell sensor located close to the display components, while switching inductive loads, and/or while being exposed to radio emission or other electromagnetic interference. In addition, the emission of the touch panel sensor is limited, which limits the excitation energy of the touch panel sensor, making it difficult to achieve sufficient signal-to-noise ratio (SNR).

BRIEF DESCRIPTION OF THE DRAWINGS

The disclosure is illustrated by way of example, and not of limitation, in the figures of the accompanying drawings.

DETAILED DESCRIPTION

The following description sets forth numerous specific details such as examples of specific systems, components, methods, and so forth, in order to provide a good understanding of various embodiments of the techniques described herein for signal processing unit of a capacitive touch sensing channel. It will be apparent to one skilled in the art, however, that at least some embodiments can be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations can vary from these exemplary details and still be contemplated to be within the scope of the present disclosure.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the disclosure. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which can also be referred to herein as "examples," are described in enough detail to enable those skilled in the art to practice the embodiments of the claimed subject matter described herein. The embodiments can be combined, other embodiments can be utilized, or structural, logical, and electrical changes can be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of techniques for simplifying the normal complexity of signal processing unit of a capacitive measurement channel with particular benefit to reducing the channel size in a multi-channel touch sensing system. While the present embodiments are applied more specifically to vehicle touch screens by way of example, they are applicable to a wide range of applications where there is a need to measure a small capacitance or other physical parameter change in the presence of other large non-informative component(s) that can be removed. In addition to touch panels generally, the present embodiments are also applicable to water level sensors, capacitive position sensors, proximity sensors, fuel level meters, inductive sensors, and the like. In various embodiments, the disclosure is designed to work with sensors that use sinusoidal excitation signals to keep overall sensor emissions low, however, the disclosure can be adapted for use with other operational waveforms.

As was discussed previously, it may be difficult to meet a high SNR requirement in capacitive touch channel measurement systems. One approach to solving these difficulties is to create a system based on a narrowband measurement channel. Narrowband means both narrowband emission and narrowband measurement. Narrowband radiation may be achieved by exciting the sensor with a sinusoidal signal.

In some capacitive measurement channels, a sigma-delta (ΣΔ) modulator (SDM) is employed in a receiver (Rx) side of the measurement channel, e.g., relevant to the present disclosure, that is coupled to an electrode, which is coupled to multiple unit cell sensors. Sigma-delta modulators output a stream of bits, typically in the form of a high-frequency, single-bit digital pulse density modulated (PDM) signal, which may be referred to herein more simply as a digital PDM signal. This output effectively represents the analog input signal from one of the unit cell sensors, but encoded differently: the density of one values over time corresponds to the amplitude of the analog signal.

A feature of the SDM is the need to use a signal reconstruction filter (SRF) coupled to the output of the SDM to convert the output SDM bitstream into a multibit stream that can be further processed to determine a measured amplitude bitstream indicative of activation of a coupled unit cell sensor. One challenge with narrowband capacitive measurement channels is the complexity of the real-time digital processing unit (SPU) due to the use of the SRF and a multibit multiplier. This complexity increases the channel size, which becomes essential in a multi-channel touch sensing system. Specifically, each capacitive measurement channel is duplicated for each channel corresponding to respective transmit (Tx) and Rx electrodes. In addition, the SPU implemented in general form may not be optimal for multiplexed sensors applications due to time constraints for measuring each unit cell sensor.

Aspects of the present disclosure address the above and other deficiencies through providing an integrated circuit, sensing device or system, and/or method that removes the SRF and a coupled down sampler, and consolidates the SPU design into direct coupling between the SDM and a demodulator and/or a low pass filter (LPF). In some embodiments, the consolidated design is employed by a redesigned LPF that includes functionality of the demodulator combined into an arithmetic unit.

In some embodiments, therefore, an integrated circuit (which covers at least part of the measurement channel) includes, but is not limited to, an SDM coupled to a receive electrode, which is selectively coupled to multiple unit cell sensors. A demodulator is coupled directly to the SDM, e.g., can be connected to the SDM. In embodiments, the demodulator generates a multibit digital signal by demodulating a digital PDM signal received from the SDM. The demodulating can include multiplying digitized cosine values with the digital PDM signal. In embodiments, a cascaded integrator-comb (CIC) filter is coupled to the demodulator and includes a first integrator and a second integrator cascaded together and to accumulate, at the second integrator, a plurality of samples of the multibit digital signal. The CIC filter can further include a single comb circuit coupled to the second integrator, the single comb circuit to generate a measured amplitude bitstream from the accumulated samples. In some embodiments, the CIC filter is a second order (or CIC2) filter.

In some other embodiments, a sensing device includes a receive electrode selectively coupled to multiple unit cell sensors. An SDM can be coupled to the receive electrode. In embodiments, a CIC filter includes a first integrator that is coupled directly to the SDM, e.g., can be connected to the SDM. In some embodiments, the first integrator includes an arithmetic unit (AU) configured to generate a multibit digital stream by changing a sign of a digitized cosine signal according to bit values of the digital PDM signal received from the SDM. The AU can further add the multibit digital stream to respective samples provided at an output of the first integrator to generate additional samples. The CIC filter can further include a first register circuit, coupled to the AU, to accumulate the additional samples as accumulated demodulation data. In some embodiments, the CIC filter is a second order (or CIC2) filter.

Therefore, advantages of the systems and methods implemented in accordance with some embodiments of the present disclosure include, but are not limited to, simplification of the measurement channel by removing the conventional SRF and down sampler and simplifying the CIC filter employed to reduce the size of a conventional comb filter, which usually includes two comb circuits, each including a subtractor and a register (or memory) unit. In this way, the present embodiments reduce the channel size of each of multiple capacitive measurement channels in a multi-channel system. As a result, significant silicon area of the circuit design of each measurement channels can be combined for an even greater impact on silicon area savings and reduction of power consumption of the overall design. Other advantages will be apparent to those skilled in the art of capacitive measurement channel design discussed hereinafter.

Figure 1:
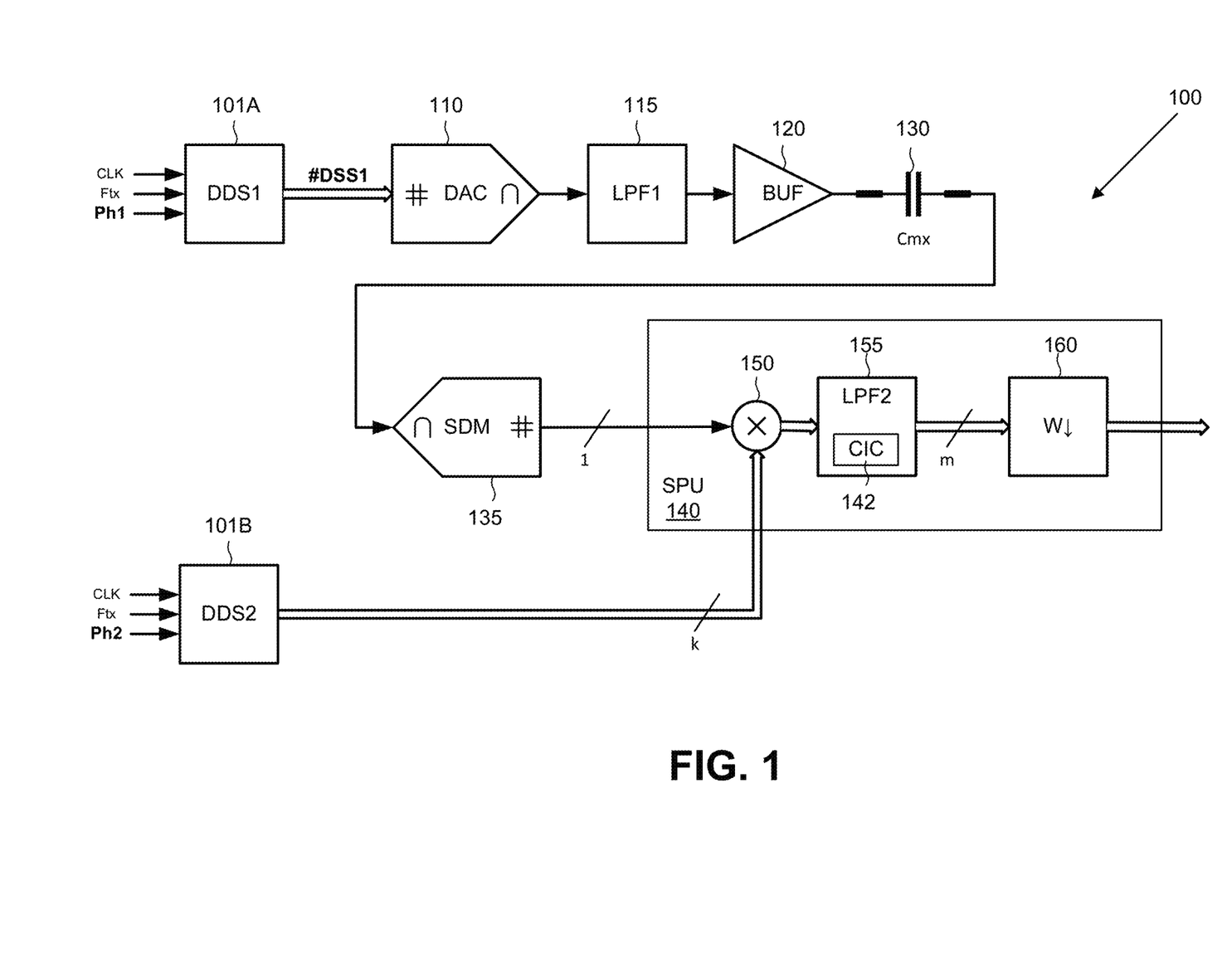
FIG. 1 is a schematic block diagram of a capacitance measurement channel according to some embodiments.

FIG. 1 is a schematic block diagram of a capacitance measurement channel 100 according to some embodiments. Some modern narrowband measurement channels, such as the one illustrated in FIG. 1, are based on an analog-to-digital converter (ADC) with high oversampling, followed by synchronous demodulation, which is provided by multiplying the output signal of the ADC by a sinusoidal signal at the frequency of the excitation signal, and averaging the demodulated signal with a low-pass filter (LPF). More specifically, the capacitance measurement channel 100 may include a first direct digital synthesis (DDS) generator 101A to generate a sine wave, which excites the capacitance measurement channel 100, including a unit cell sensor 130, which represents one cross-section of an transmit (Tx) electrode and a receive (Rx) electrode in a touch panel sensor. In some embodiments, the sine wave generated by the DDS generator 101A is converted to analog form using a digital-to-analog converter (DAC), which is then processed by a first LPF 110, e.g., to filter out high-order quantization noise.

In some embodiments, the analog frontend on the receive side, which is coupled to the unit cell sensor 130, includes a sigma-delta modulator (or SDM 135) and an SPU 140 coupled to the SDM 135. In embodiments, the SPU 140 is a simplified set of signal processing components, which includes a demodulator 150, a second LPF 155, and a down sampler 160. In embodiments, the SDM 135 is a high-oversampling-rate ADC configured to increase the ADC resolution. The capacitive measurement channel 100 may further include a second DSS 101B, which may generate a second sine wave (e.g., that is out of phase with the original sine wave generated by the first DSS 101A, and thus may be considered a cosine wave), which is multiplied by the demodulator 150 with the output of the SDM 135. This demodulated signal can be processed by the second LPF 155 and the second down sampler 160 before being sent to post-processing a host system (not illustrated).

In some embodiments, demodulator 150 generates a multibit digital signal by demodulating a digital pulse density modulated (PDM) signal received from the SDM 135. In such embodiments, the LPF 155 is or includes a CIC filter 142 configured to accumulate and decimate samples taken of the multibit digital signal to generate a measured amplitude bitstream, e.g., a bitstream representing a amplitude of the unit cell sensor being measured. In embodiments, double the passband of the second LPF 155 determines the passband of the capacitance measurement channel 100. In embodiments, a buffer 120 is interposed between the first LPF 115 and the unit cell sensor 130. In some embodiments, the CIC filter 142 is a second order (or CIC2) filter that is reduced in complexity and footprint particularly in the comb circuit of the CIC2 filter.

For example, in some embodiments, the CIC filter 142 includes a first integrator and a second integrator cascaded together and which are to accumulate, at the second integrator, a plurality of samples of the multibit digital signal received from the SDM 135. In embodiments, the CIC filter 142 further includes a comb circuit coupled to the second integrator and that includes a register circuit to, while the SDM is coupled to one of the multiple unit cell sensors, store and multiply the accumulated samples by two to generate accumulated data delayed by a decimation factor (M). In embodiments, the comb circuit further includes a subtractor coupled to the second integrator and the register circuit. The subtractor can subtract the accumulated data from twice the plurality of samples accumulated by the second integrator at an end of a measurement window, e.g., to compensate for the measurement window having a length of twice the decimation factor. The CIC filter 142 will be discussed in more detail hereinafter.

Figure 2:
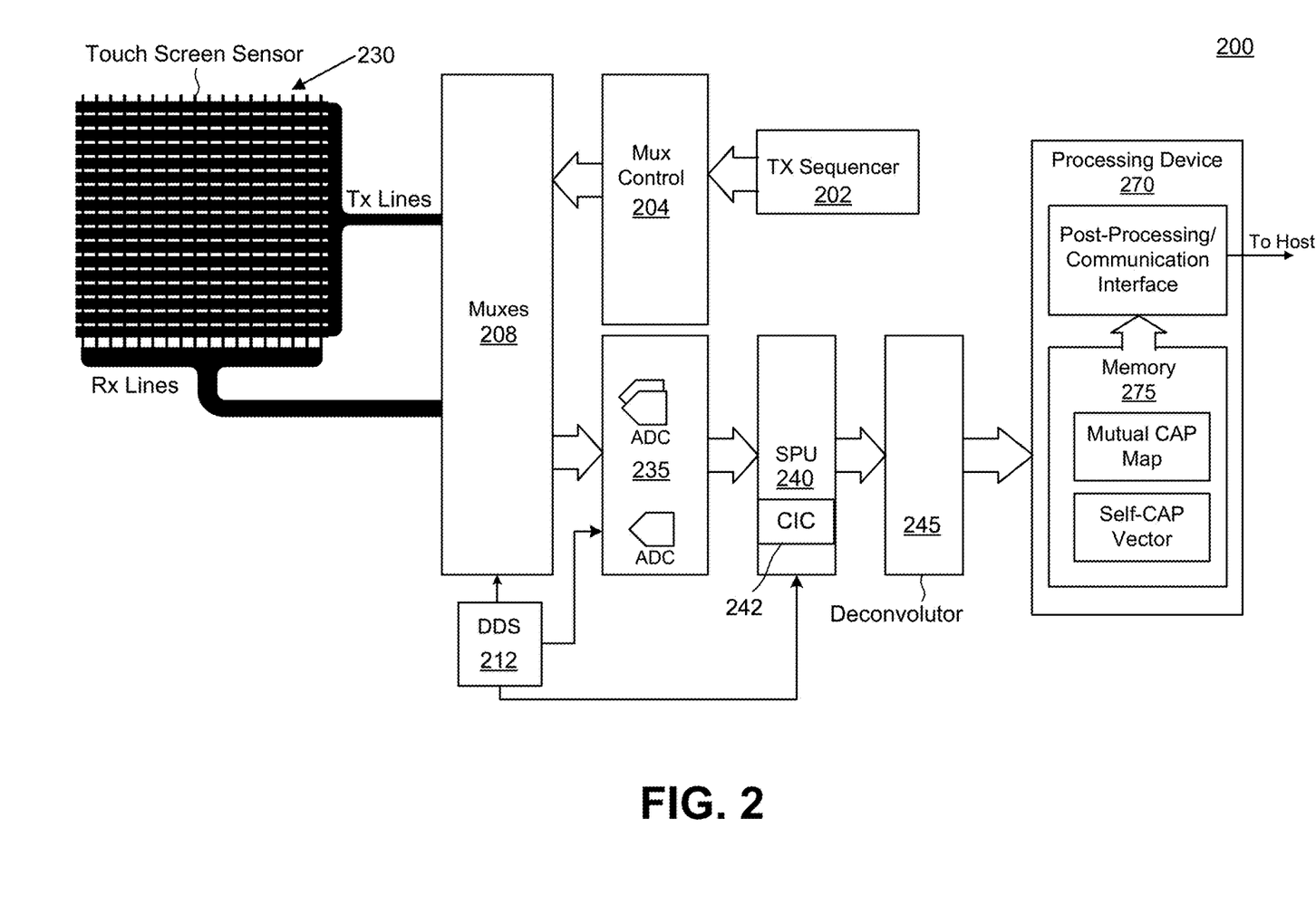
FIG. 2 is a schematic block diagram of a system for sensing a touch screen sensor according to some embodiments.

FIG. 2 is a schematic block diagram of a system 200 (or sensing device) for sensing a touch screen sensor according to some embodiments. In some embodiments, the system 200 (or device) includes a the touch screen sensor 230 that is formed by an orthogonal grid of electrodes, the Tx and Rx electrodes referred to earlier. In embodiments, each cross-section of a Tx and an Rx electrode is a unit cell sensor that can be individually measured; thus, the touch screen sensor 230 may be composed of multiple unit cell sensors. A Tx sequencer 202 may control the excitation of the Tx electrodes through a plurality of Rx lines, e.g., in connection with a multiplexer controller 204. A multiplexer group 208 may include two multiplexers, one for controlling the Tx electrodes and another for controlling the Rx electrodes. A DDS generator 212 can be employed to generate the sine waves used for electrode excitation, as discussed herein.

In some embodiments, the system 200 further includes an ADC group 235 having individual ADCs for each capacitive measurement channel (e.g., each ADC coupled to a respective Rx electrode through a respective Rx line and Rx multiplexer). In some embodiments, the ADCs of the ADC group 235 are SDMs such as the SDM 135 (FIG. 1), but other types of ADCs are envisioned. In some embodiments, the system 200 also includes a signal processing unit or SPU 240 having a respective demodulator 150 and/or a CIC filter 242 coupled to a respective ADC 235 for each capacitive measurement channel. In at least one embodiment, the SPU 240 is the SPU 140 discussed in relation to FIG. 1. The SPU 224 can demodulate and filter the multibit digital signals received from the respective ADCs to obtain the magnitude of the response from the respective unit cell sensors.

In some embodiments, the system 200 further includes a deconvolutor 245 coupled between the SPU 240 and a processing device 270. The deconvolutor 245 may process the sensor response data by a deconvolution to separate the responses of each cross element of the sensor grid (e.g., distinguish response signals between the unit cell sensors). The processing device 270 can include memory 275, e.g., in which to store the deconvoluted data as a mutual capacitance map and a self-capacitive map. In embodiments, the memory 275 is to store a plurality of measured amplitude bitstreams corresponding to the multiple unit sensors. The processing device 270 can further include code or programs for performing post-processing and sending the measured capacitive data to a host. This code or programs may be firmware, software, or a combination thereof.

Figure 3:
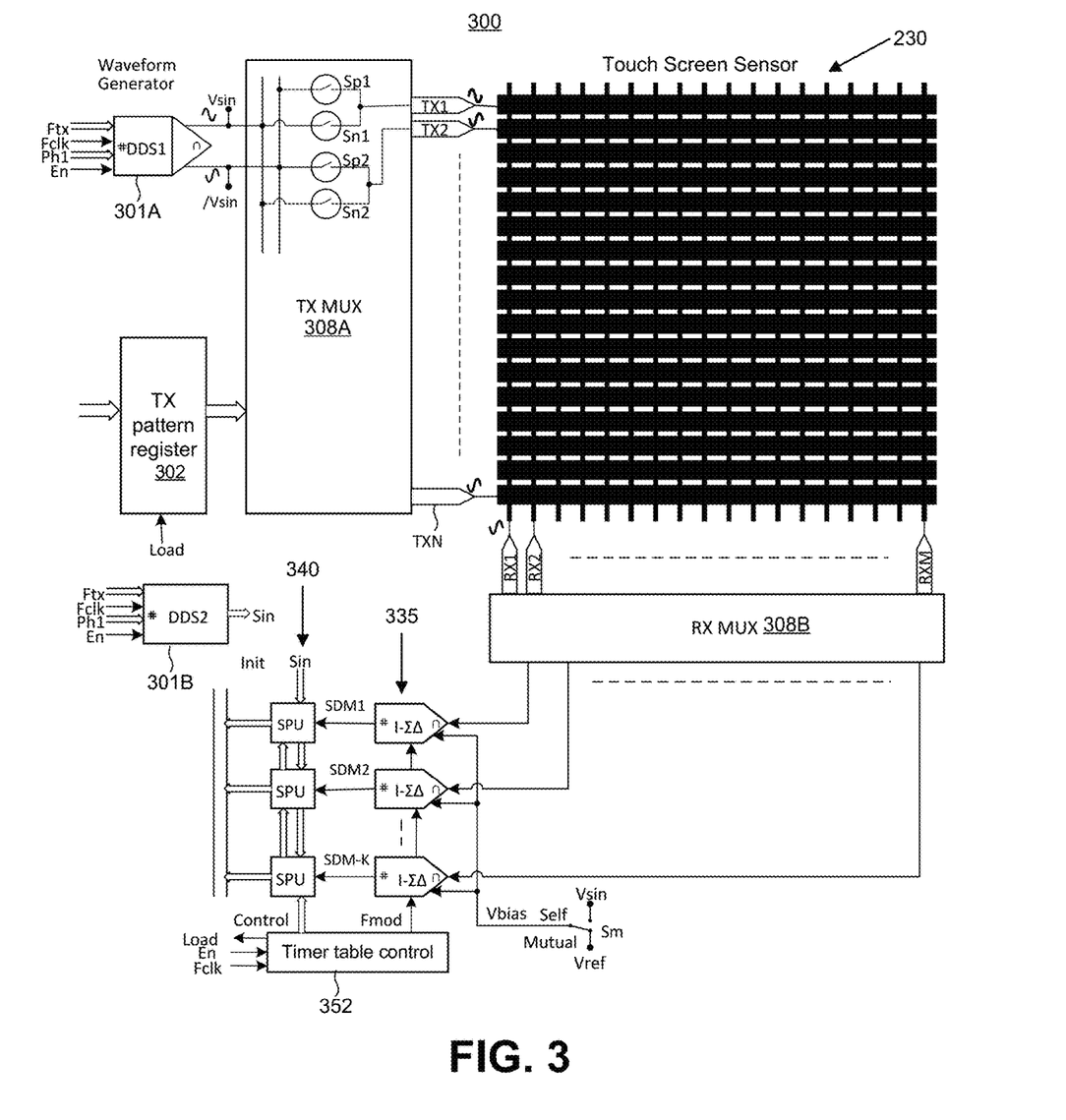
FIG. 3 is a schematic block diagram of an analog frontend of the system of FIG. 2 according to some embodiments.

FIG. 3 is a schematic block diagram of an analog frontend 300 of the system 200 of FIG. 2 according to some embodiments. In various embodiments, the analog frontend 300 includes a first waveform generator 301A, a Tx pattern register 302, a Tx multiplexer 308A, which is coupled to Tx lines and electrodes of the touch screen sensor 230, an Rx multiplexer 308B, which is coupled to the Rx lines and Rx electrodes, a plurality of SDMs 335 coupled to a plurality of SPUs 340, and a second waveform generator 301B to be employed within the SPUs 340 (see the Sin signal). In some embodiments, the SPUs 340 are each designed like the SPU 140 discussed with reference to FIG. 1.

In some embodiments of the analog frontend 300, the first waveform generator 301A generates excitation signals at the frequency Ftx, including output signals of opposite phase. These excitation signals are passed to the Tx multiplexer 308A where the excitation signals are distributed to the sensor Tx electrodes to form an excitation sequence. In embodiments, the Tx pattern register 302 determines this sequence, which can change during the scan of the unit cell electrodes across the touch screen sensor 230. The excitation through the Tx electrodes generates current in the Rx electrodes. In embodiments, these currents are proportional to the mutual capacitances formed at crossings of the Rx electrodes by the Tx electrodes. The Rx currents may be passed to current-mode SDMs 335 through the Rx multiplexer 308B.

A property of the current-mode input circuit (e.g., associated with the SDMs 335 and the SPUs 340) is a near-zero dynamic input resistance and a constant input voltage (e.g., bias voltage). This property makes it possible to cause the input current to be independent of the capacitance between the Rx electrode and ground (defined as self-capacitance), since this capacitance is not recharged during measurements. Thus, this measurement mode may be referred to as mutual-capacitance measurement mode. Further, the current mode input allows modulation of the bias voltage of the Rx electrode. If the same modulation voltage is applied to the Tx electrodes, the mutual capacitance between the electrodes does not recharge or affect the Rx current. In this case, the current is generated by recharging the self-capacitance of the Rx electrode. This measurement mode may be referred to as self-capacitance measurement mode.

In various embodiments, these two measurement modes are used to detect water droplets on the surface of the touch screen sensor 230. Water drops distort the value of the mutual capacitance, which leads to errors in the recognition of the contact position. But these drops do not affect the value of the self-capacitance. Just placing a finger near the sensor electrodes creates a circuit that makes an extra path from the electrode to ground, which changes a self-capacitance of an electrode. Thus, if a change in the self-capacitance is not detected (without a finger touch), the values of the mutual capacitances can be considered as a base level, even if distorted by water drops. The base level can be subtracted from the next measurement, compensating for mutual capacitance distortion.

In some embodiments, switching to the self-capacitance measurement mode is performed by setting switch (Sm) to an up position and connecting the Tx electrodes to Vsin output by the first waveform generator 302A, e.g., by closing the Sp switches in the Tx multiplexer 308A. In at least some embodiments, the analog frontend 300 within the system 200 works cyclically, changing from mutual capacitance mode to self-capacitance mode and back again to mutual capacitance mode, and so forth. The mutual-capacitance mode stage may include K measurements with different excitation patterns until all the Tx lines (and corresponding electrodes) are scanned. At the stage of the self-capacitance mode, one measurement can be performed that measures self-capacitance for the entire touch screen sensor 230. The sequence of stages in the work cycle need not matter. In some embodiments, control logic 352 of the analog frontend 300 can send control and timing signals to the SDMs 335 and SPUs 340, including the Fmod signal and control signals resetting the CIC filters, for decimation, and defining the measurement window (see FIG. 7).

In some embodiments, capacitance is measured over a period of time, which is referred to herein as the measurement window. This measurement window length can determine the channel immunity and SDM resolution, where the longer the measurement window, the better channel immunity and SDM resolution. But the duration of the measurement window can be limited by the duration of the work cycle, which is determined by the data refresh rate of the SDM 335 (e.g., Fmod). In some embodiments, a valid measurement result is generated at the end of the measurement window, which means that a filter (e.g., within the SPUs 340) should be in a steady state at the end of the measurement window.

In at least some embodiments, an effective approach for SDM data filtering (e.g., to employ within the SPUs 340) is a cascaded integrator-comb filter (CIC) due to simplicity of implementation. The number of integrator-comb circuits determines the order of the filter, where the typical second order CIC filter (e.g., CIC2 filter) includes a cascaded stream of two integrators and two comb circuits. This arrangement of each CIC2 filter, however, involves a lot of repeated circuitry over the sometimes dozens of measurement channels. The integrator section sums (integrates) the incoming samples over time, which in a decimator, helps in averaging the samples before reducing the sampling rate, effectively acting as a low-pass filter to prevent aliasing. The comb section may act as a differencer that operates with a delay, e.g., subtracting a delayed version of the signal from the current signal, which helps in sharpening the frequency response of the CIC2 filter.

In typical CIC filters, the integrators can operate at the SDM frequency, and the comb circuits can use the data after delay by the decimation factor (M). For the same decimation factor, a higher-order filter has better for resolution and immunity, but takes proportionally longer to reach steady state. If the CIC filter is a first order filter, the decimation is defined by the measurement window (Tw) and the SDM data rate Fmod as $$M = Tw \cdot Fmod. \tag{1}$$

Figure 6:
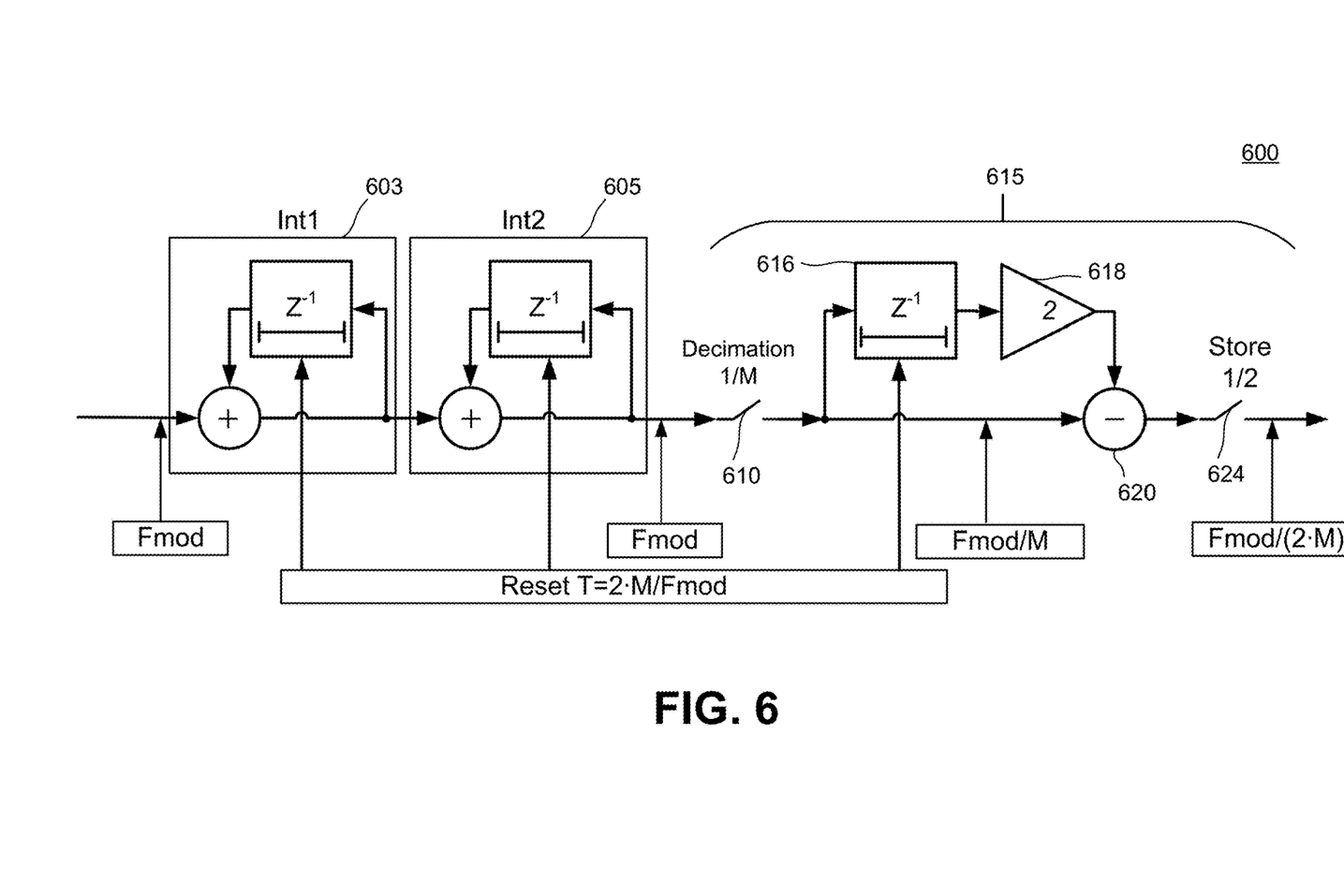
FIG. 6 is a schematic block diagram of a CIC filter within a signal processing unit (SPU) of FIG. 3 according to an embodiment.
Figure 8:
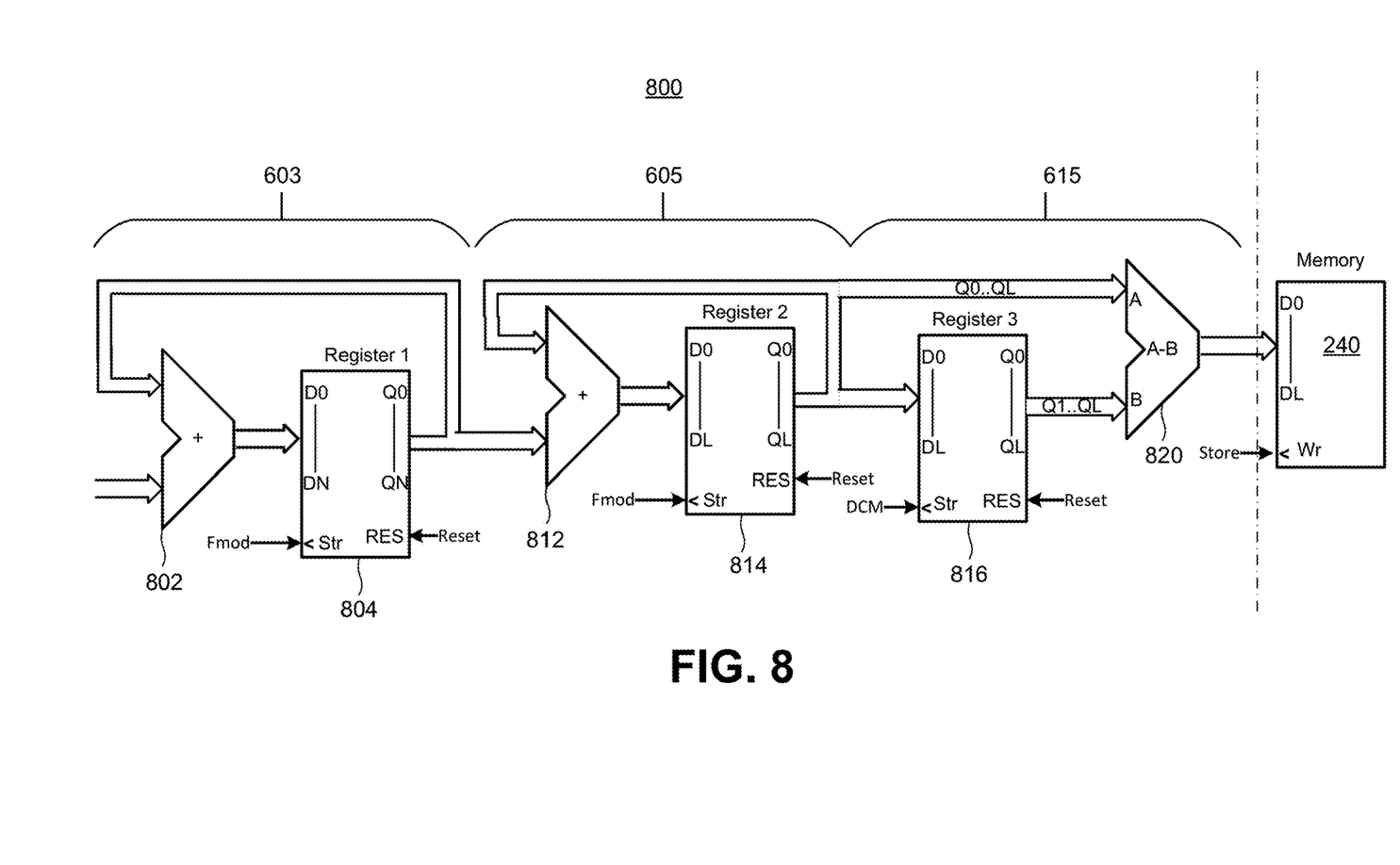
FIG. 8 is a schematic diagram of the CIC filter of FIG. 6 according to some embodiments.

Since the CIC1 filter reaches a steady state at the end of the measurement window and the next window corresponds to a different data source, measurement history need not be saved in the integrator for the next measurement window. Or, the integrator can be reset and integrate new data until the end of the measurement window when the data is stored and a new measurement window started thereafter. Therefore, the CIC filter 142 or 242 can be simplified to the integrator and a simplified comb circuit, as illustrated in FIG. 6 and FIG. 8.

Figure 4:
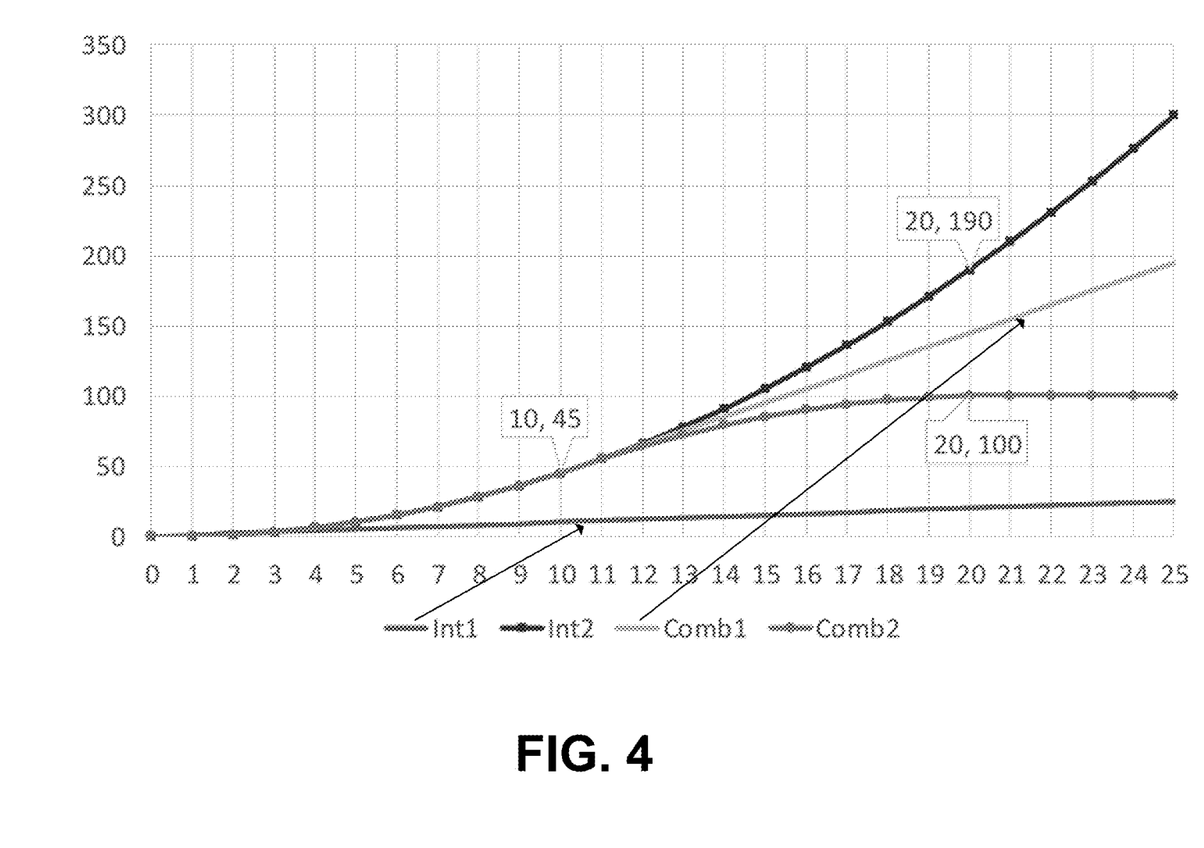
FIG. 4 is a graph illustrating a step response of a second order cascaded integrator-comb (CIC) filter components with integrator decimation factors of ten (M=10) according to an embodiment.

FIG. 4 is a graph illustrating a step response of CIC2 filter components with integrator decimation factors of ten (M=10) according to an embodiment. When using the CIC2 filter, the steady state can be reached after two decimated samples. The step response of CIC2, whose decimation factor (M) is 10, is illustrated in FIG. 4. Note that the steady state is reached at the 20th input sample. So, to get a valid result at the end of the measurement window, which is the same as for the CIC1 filter, the CIC2 filter needs to reduce the decimation factor by a factor of two. In the case of a third order CIC (or CIC3) filter, the decimation factor can be reduced by a factor of three compared to the CIC1 filter to keep the same measurement window.

Figure 5:
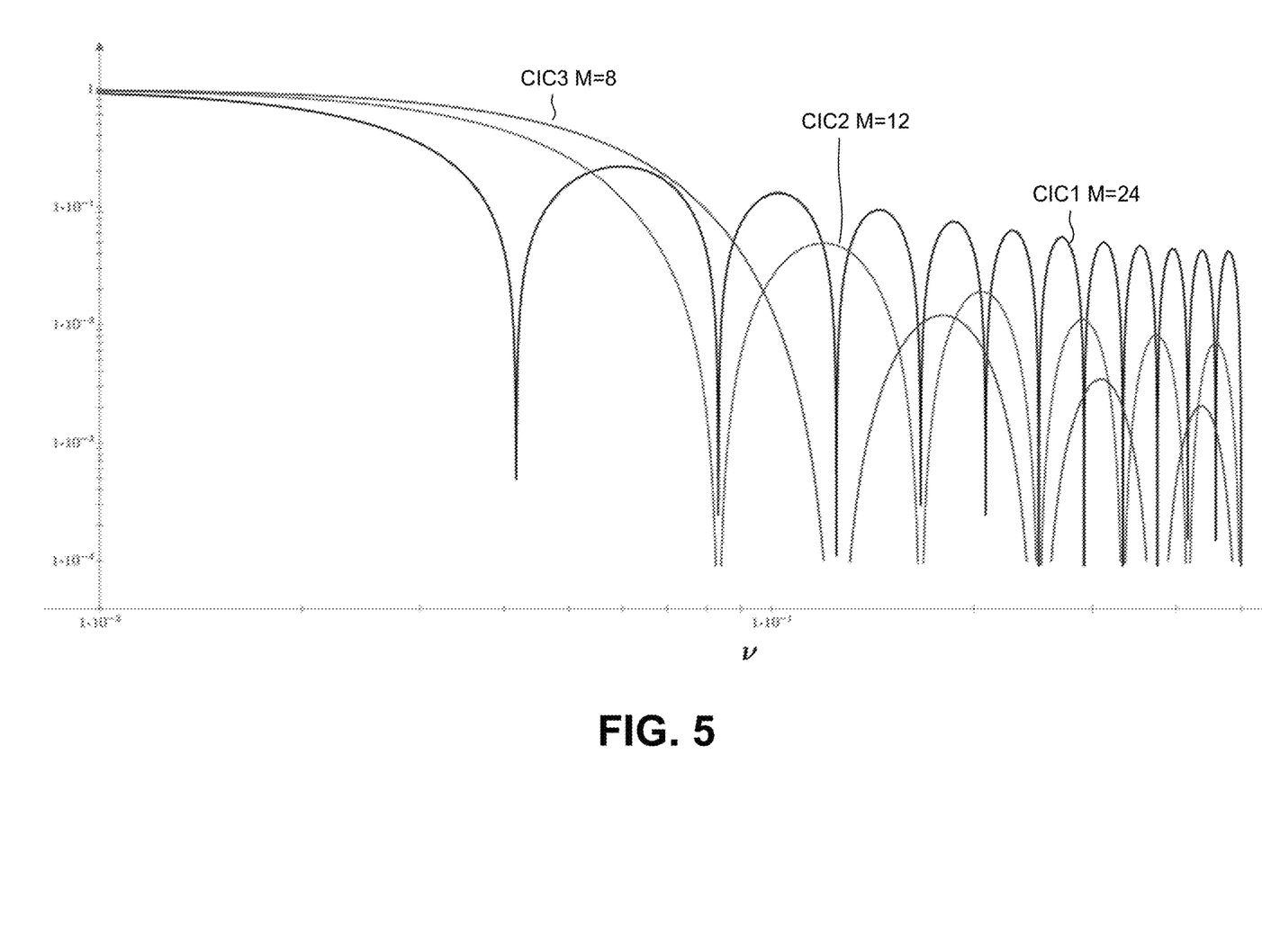
FIG. 5 is a graph illustrating a frequency response of different CIC filters of different orders for a constant measurement window according to some embodiments.

FIG. 5 is a graph illustrating a frequency response of different cascaded CIC filters of different orders for a constant measurement window according to some embodiments. A decrease in the decimation (or M) factor of higher-order filters leads to a proportional increase in the width of the lobes of the frequency response. As illustrated, a first order (or CIC1) filter with a decimation factor of 24, has smaller lobes than a second order (or CIC2) filter with a decimation factor of 12, which again has smaller lobes than a third order (or CIC3) filter with a decimation factor of 8. By obtaining a better attenuation of the high-pass signal of the high-order CIC filter, one obtains a wider bandwidth, which contradicts the requirements of a narrowband measurement channel. To obtain a minimum quantization error of the SDM, a high-order CIC filter can be employed. However, SDM-based capacitive channel simulation for a constant measurement window shows minimal quantization error if the capacitive measurement channel is built on second-order SDMs and CIC filters. Therefore, a CIC2 filter can be thought of an optimum structure to minimize a size of the CIC filter 142 or 242 compared to a typical CIC2 filter.

In some embodiments, the simplification of the CIC2 filter can be made based on decimation and resetting the CIC2 filter at the beginning of each measurement window because the measurement history for a previous sensor is not needed for the current measurement. Thus, in each measurement window, filtering starts with zero conditions, e.g., at reset. If the filtering result is stored at the end of the measurement window after arrival of 2·M samples, the CIC2 does not require two comb circuits or blocks. It is enough to subtract the doubled value of the second integrator in the middle of the measurement window from the value of the integrator positioned at the end of the measurement window. Therefore, the proposed CIC2 filter can be designed with only a single modified comb block, as will be discussed now in more detail.

Figure 7:
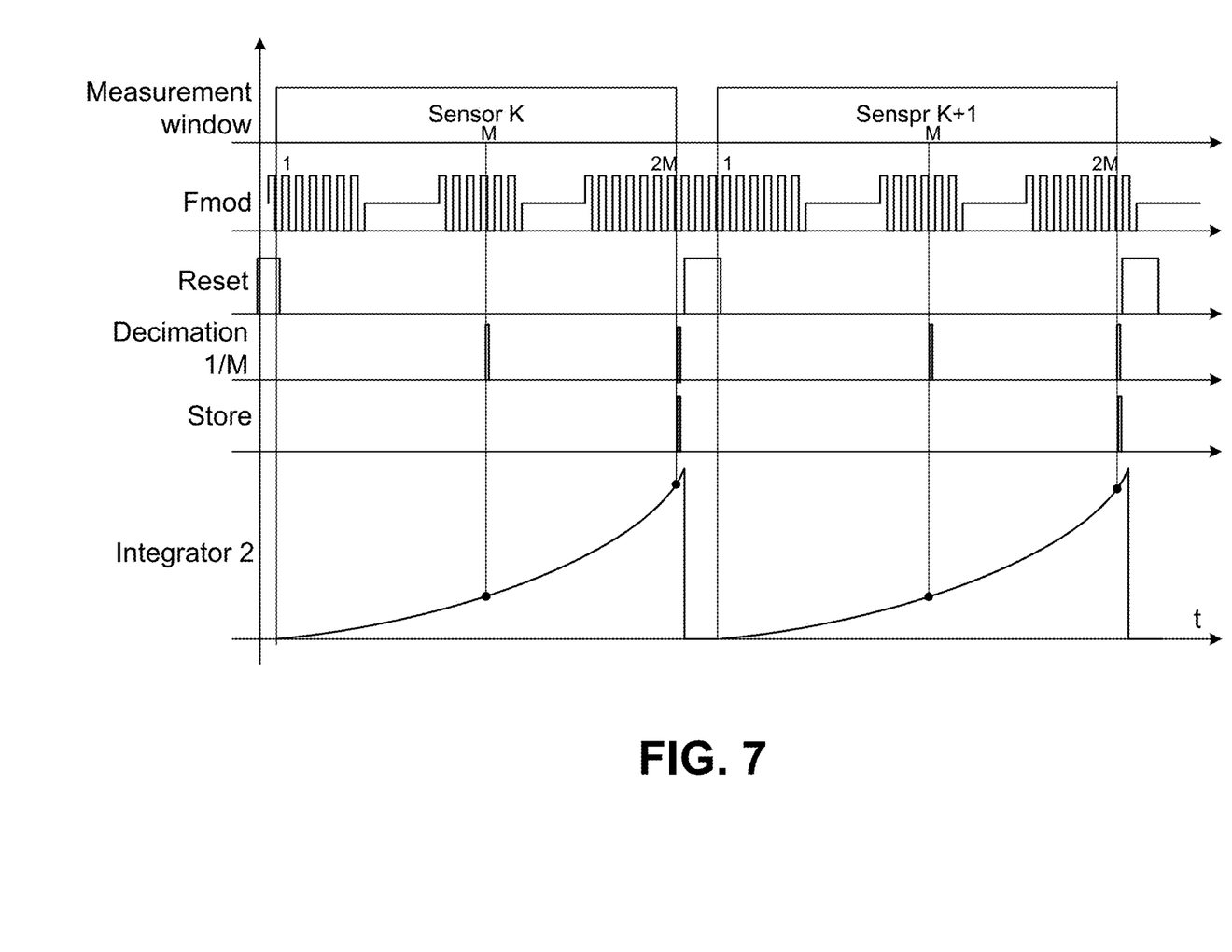
FIG. 7 is a graph of signals of a CIC filter associated with two sequentially-located unit cell sensors according to some embodiments.

FIG. 6 is a schematic block diagram of a CIC filter 600 within a signal processing unit (SPU) of FIG. 3, e.g., any of the SPUs 340, according to an embodiment. FIG. 7 is a graph of signals of the CIC filter 600 associated with two sequentially-located unit cell sensors according to some embodiments. In embodiments, as discussed, the CIC filter 600 is coupled to and receives, as an input, the output from one of the SDMs 335. For example, an SDM can be coupled to a receive electrode, which is selectively coupled to multiple unit cell sensors through the Rx multiplexer 308B.

In at least some embodiments, the CIC filter 600 includes a first integrator 603 and a second integrator 605 cascaded together that are to accumulate, at the second integrator 605, a plurality of samples of a digital PDM signal received from the SDM. Each of the first integrator 603 and the second integrator 605 can include a register circuit and a summer to perform the accumulation of the input samples. In embodiments, the first integrator 603 and the second integrator 605 begin accumulating after reset at a beginning of a measurement window. The measurement window can include twice a number of samples as the decimation factor (e.g., 2M), as illustrated in FIG. 7.

In some embodiments, the CIC filter 600 further includes a comb circuit 615 coupled to the second integrator 605 having a design that is modified from the cascaded comb circuits of a typical CIC2 filter. For example, the comb circuit 615 can include a register circuit 616 to, while the SDM is coupled to a first sensor of the multiple unit cell sensors, store and multiply the accumulated samples by two to generate accumulated data delayed by a decimation factor. In some embodiments, a multiplier 618 is coupled to an output of the register circuit 616 to perform the multiplication by two (or doubling) of the accumulated samples received from the second integrator 605.

In some embodiments, a decimation switch 610 is coupled between the second integrator 605 and the comb circuit 615, although the decimation (1/M) may also be performed within or by the register circuit 616. For example, the register circuit 616 can further decimate the accumulated samples by the decimation factor (M) to generate the accumulated data. In some embodiments, the decimation factor is based on a frequency modulation (Fmod) rate of the SDM (see FIG. 7).

In some embodiments, the comb circuit 615 further includes a subtractor 620 coupled to the second integrator 605 and the register circuit 616. The subtractor 620 can subtract the accumulated data (e.g., stored in the register circuit 616) from twice the plurality of samples accumulated by the second integrator 605 at an end of a measurement window.

In some embodiments, the comb circuit 615 receives every Mth sample from the second integrator 605. At the end of the measurement window, in accordance with FIG. 6, the comb circuit 615 calculates $$\text{Comb}=\text{Int2}[2\cdot M]-2\cdot\text{Int2}[M] \qquad (2)$$

In embodiments, the result of this calculation, when triggered by a store signal at a store switch 624, is stored in memory, e.g., the memory 275 (FIG. 2). After that, the CIC filter 600 is reset, the measurement channel is switched to another unit cell sensor, and the next measurement starts with reset set to zero.

FIG. 8 is a schematic diagram of a CIC filter 800 of FIG. 6 according to some embodiments, illustrating the CIC filter 600 from a structural standpoint. For example, the CIC filter 800 may include the first integrator 603, the second integrator 605, and the comb circuit 615, each composed of a register circuit. For example, the first integrator 603 can include a first summer 802 coupled to a first register circuit 804, the first summer 802 to add an output of the first register circuit 804 to an input of the first register circuit 804. The second integrator 605 can include a second summer 812 coupled to a second register circuit 814, the second summer 812 to add an output of the second register circuit 814 to the output of the first register circuit 804, and thus accumulate the samples of both the first and second integrators 603 and 605.

In at least some embodiments, the comb circuit 615 includes a third register circuit 816 configured to, while the SDM is coupled to a first sensor of the multiple unit cell sensors, store and multiply the accumulated samples by two to generate accumulated data delayed by a decimation factor. In embodiments, the accumulated samples are multiplied by two by shifting corresponding bits one position higher at a register output of the third register circuit 824. Thus, for example, instead of outputting Q0 to QL, the bits are shifted up by one and the output of the third register becomes Q1 to QL, where Q1 is the least significant bit and QL is the most significant bit. In this way, the multiplication is built into the third register 816 without requiring an separate multiplier.

In this way, the third register circuit 816 can store the value of the second integrator 605 after accumulating M samples. This is done by applying a discontinuous conduction mode (DCM) signal after Mth sample. The output of the second integrator 603 can be applied to the A input of a subtractor 820. The output of the third register circuit 816, multiplied by 2×, can be applied to the B input of a subtractor 820. Multiplication of register data of the third register circuit 816 can be provided by connecting its output to the subtractor 820 with a shift of one bit (subtractor input B0 is connected to zero, register output Q0 is connected to subtractor input B1, register output Q1 is connected to subtractor input B2, and so forth.). At the end of the measurement window (with 2M samples), the subtractor output can be transferred to the memory 275 using the store signal (see FIG. 7).

In some embodiments, therefore, the analog frontend 300 of FIG. 3 includes the Rx multiplexer 308B coupled to the receive electrode and control logic 352 coupled to the multiplexer 308B and the CIC filter 600 or 800 (assumed to be located within the SPUs 340). In embodiments, the control logic, after causing an output of the subtractor to be stored in the memory 275, resets the first and second integrators 603 and 605 (e.g., the first and second register circuits 604 and 605) and the third register circuit 615. The control logic 352 can further cause the Rx multiplexer 308B to select a second sensor of the multiple unit cell sensors to measure, and the measuring continues through the mutual-capacitance mode and then also as connected in self-capacitance mode to capture all measurements.

Figure 9:
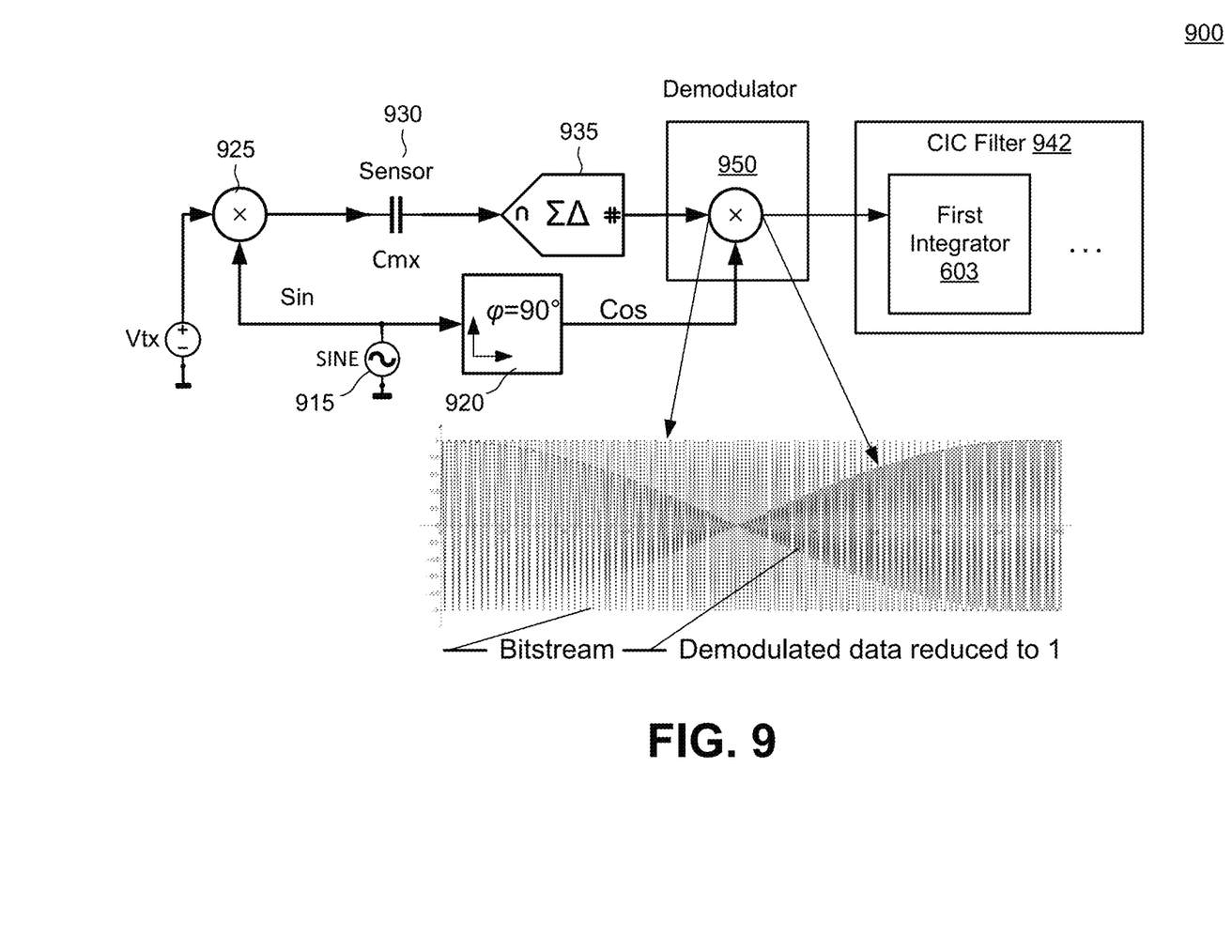
FIG. 9 is a schematic block diagram of analog frontend circuitry that includes a demodulator between the sigma-delta modulator and the CIC filter according to an embodiment.

FIG. 9 is a schematic block diagram of analog frontend circuitry 900 that includes a demodulator between the sigma-delta modulator and the CIC filter according to an embodiment. The following filter modification can simplify the multiplication function used to demodulate the sensor signal. It is proposed here to demodulate a SDM bitstream, also referred to herein as the signal PDM signal, without a signal reconstruction filter by directly multiplying the SDM bitstream by a multibit demodulation signal.

For example, the analog frontend circuitry 900 may further include an input voltage (Vtx) modulated, by a multiplier 925, with a sine wave generated by a sine wave generator 915. A cosine converter 920 (which can be a cosine table in one embodiment) can be employed to generate digitized cosine values (Cos). The analog frontend circuitry 900 can further include a unit cell sensor 930 coupled between the multiplier 925 and a demodulator 950, which is in turn coupled to a CIC filter 942 (such as the CIC filter 142, 242, 600, or 800).

In some embodiments, the demodulator 950 is thus directly coupled between the SDM 935 and the first integrator 603 (see FIG. 6 and FIG. 8) of the CIC filter 942. In embodiments, the demodulator 950 demodulates bits, of the plurality of samples received from the SDM 935, by the digitized cosine values, generating a demodulated bitstream (also referred to herein as a multibit digital signal) at an input to the first integrator 603. In some embodiments, the one ("1") and zero ("0") values of the SDM 935 output can be considered as +1/−1 data values, respectively. In this case, the demodulating signal can be multiplied by +1/−1. This means that the demodulator 950 can simply change the data sign of the cosine values according to the SDM output (assuming that both signals are synchronized).

Figure 10:
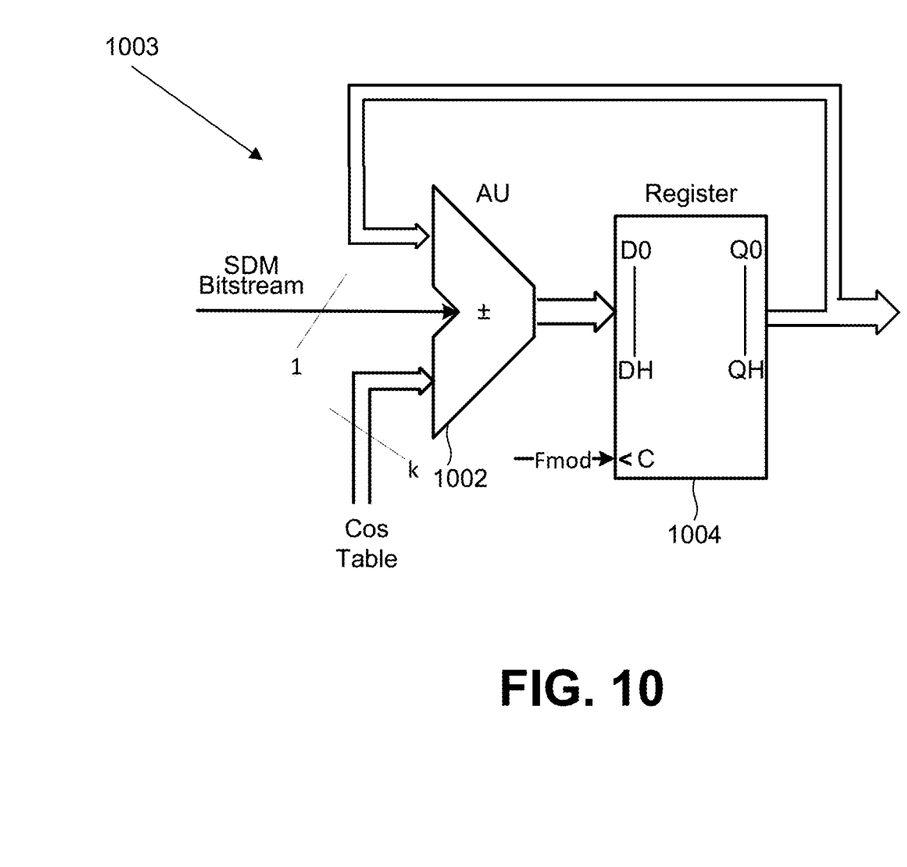
FIG. 10 is a schematic diagram of integration of the demodulator (e.g., of FIG. 9) with the first integrator according to an embodiment.

FIG. 10 is a schematic diagram of integration of the demodulator (e.g., the demodulator 950 of FIG. 9) with the first integrator 603 of FIG. 6 and FIG. 8 according to an embodiment. For example, a first integrator 1003 can be coupled to the SDM 935 to demodulate bit values of the digital PDM signal received from the SDM 935 and to accumulate the demodulated bit values. More specifically, the first integrator 1003 can include an arithmetic unit (AU) 1002 configured to change a sign of a digitized cosine signal (e.g., which can be provided by a cosine table) according to bit values of the digital PDM signal received from the SDM 935, to generate the demodulated bit values within a multibit digital stream. The AU 1002 can further add values of the multibit digital stream to respective samples provided at an output of the first integrator to generate additional samples. In embodiments, the first integrator 1003 includes a register circuit 1004 coupled to the AU 1002, the first register circuit 1004 to accumulate the additional samples as accumulated demodulation data for the second integrator 605 (FIG. 6).

Figure 11:
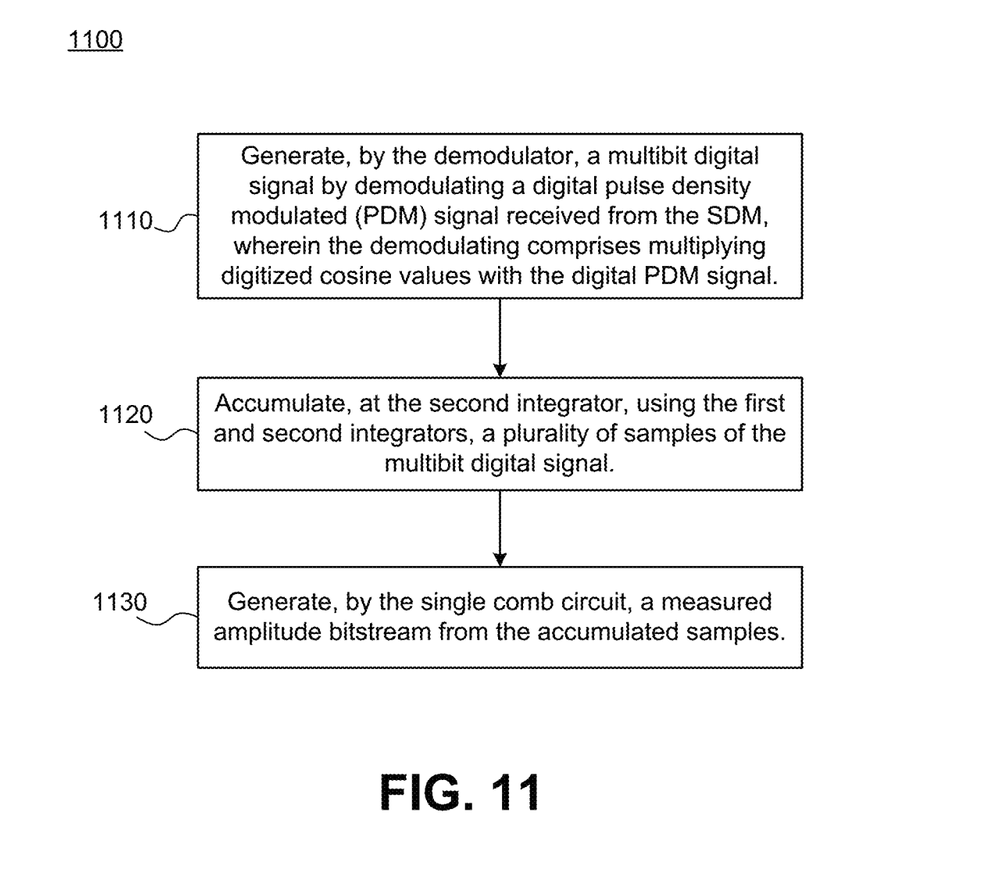
FIG. 11 is a flow diagram of a method of operating an integrated circuit with the disclosed CIC filter according to an embodiment.

FIG. 11 is a flow diagram of a method 1100 of operating an integrated circuit with the disclosed CIC filter according to an embodiment. The method 1100 can be performed at least in part by processing logic that includes hardware (e.g., circuitry, dedicated logic, programmable logic, microcode, etc.), firmware, or a combination thereof. In one example embodiment, the method 1100 is performed by the analog frontend circuitry such as any of the CIC 142, 242, 600, 800, or 942 of FIG. 1, FIG. 2, FIG. 6, FIG. 8, or FIG. 9, respectively. Although illustrated in a particular order, the operations of the method 1100 need not be performed in a particular order unless expressly or inherited described in a certain order.

At operation 1110, the method 1100 includes generating, by the demodulator, a multibit digital signal by demodulating a digital pulse density modulated (PDM) signal received from the SDM. In embodiments, the demodulating comprises multiplying digitized cosine values with the digital PDM signal.

At operation 1120, the method 1100 includes, accumulating, at the second integrator, using the first and second integrators, a plurality of samples of the multibit digital signal.

At operation 1130, the method 1100 includes, generating, by the single comb circuit, a measured amplitude bitstream from the accumulated samples.

In some embodiments, the method 1100 further includes storing, by a register circuit of the CIC filter, while the SDM is coupled to a first sensor, the accumulated samples as decimated accumulation samples delayed by a decimation factor. The method 1100 can further include multiplying, by the register circuit, the decimated accumulation samples by two to generate accumulated data. The method 1100 can further includes subtracting, by a subtractor of the CIC filter, the accumulated data from twice the plurality of samples accumulated by the second integrator at an end of a measurement window.

The method 1100 can further include decimating, by the register circuit, the accumulated samples by the decimation factor to generate the accumulated data, and wherein the decimation factor is based on a frequency modulation rate of the SDM.

The method 1100 can further include causing, by the control logic, an output of the subtractor to be stored in memory; resetting, by the control logic, the first and second integrators and the register circuit; and causing, by the control logic, the multiplexer to select a second sensor to measure.

The method 1100 can further include demodulating, by the demodulator, bits of the plurality of samples by digitized cosine values, generating a demodulated bitstream; and passing, by the demodulator, the demodulated bitstream to an input of the first integrator.

In the above description, some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "communicating," "modifying," "measuring," "determining," "sending," "comparing," "maintaining," "switching," "controlling," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example" or "exemplary" is not necessarily to be construed as preferred or advantageous over other aspects or designs. Rather, the use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. An integrated circuit comprising:
a sigma-delta modulator (SDM) coupled to a receive electrode, which is selectively coupled to multiple unit cell sensors;
a demodulator coupled directly to the SDM, the demodulator to generate a multibit digital signal by demodulating a digital pulse density modulated (PDM) signal received from the SDM, wherein the demodulating comprises multiplying digitized cosine values with the digital PDM signal; and
a cascaded integrator-comb (CIC) filter coupled to the demodulator, the CIC filter comprising:
a first integrator and a second integrator cascaded together and to accumulate, at the second integrator, a plurality of samples of the multibit digital signal; and
a single comb circuit coupled to the second integrator, the single comb circuit to generate a measured amplitude bitstream from the accumulated samples.

2. The integrated circuit of claim 1, wherein the single comb circuit comprises:
a register circuit to, while the SDM is coupled to a first sensor of the multiple unit cell sensors, store and multiply the accumulated samples by two to generate accumulated data delayed by a decimation factor; and
a subtractor coupled to the second integrator and the register circuit, the subtractor to subtract the accumulated data from twice the plurality of samples accumulated by the second integrator at an end of a measurement window.

3. The integrated circuit of claim 2, wherein the register circuit is further to decimate the accumulated samples by the decimation factor to generate the accumulated data, and wherein the decimation factor is based on a frequency modulation rate of the SDM.

4. The integrated circuit of claim 2, wherein the measurement window includes twice a number of samples as the decimation factor, and the CIC filter is a second order filter.

5. The integrated circuit of claim 2, wherein the accumulated samples are multiplied by two by shifting corresponding bits one position higher at a register output of the register circuit.

6. The integrated circuit of claim 2, wherein the register circuit is a third register circuit, and wherein the CIC filter further comprises:
a first summer coupled to a first register circuit of the first integrator, the first summer to add an output of the first register circuit to an input of the first register circuit; and
a second summer coupled to a second register circuit of the second integrator, the second summer to add an output of the second register circuit to the output of the first register circuit.

7. The integrated circuit of claim 2, further comprising:
a multiplexer coupled to the receive electrode; and
control logic coupled to the multiplexer and the CIC filter, the control logic to:
after causing an output of the subtractor to be stored in memory, reset the first and second integrators and the register circuit; and
cause the multiplexer to select a second sensor of the multiple unit cell sensors to measure.

8. The integrated circuit of claim 7, further comprising the memory to store a plurality of measured amplitude bitstreams corresponding to the multiple unit cell sensors.

9. A sensing device comprising:
a receive electrode selectively coupled to multiple unit cell sensors;
a sigma-delta modulator (SDM) coupled to the receive electrode; and
a cascaded integrator-comb (CIC) filter comprising a first integrator coupled directly to the SDM, wherein the first integrator comprises:
an arithmetic unit (AU) configured to:
generate a multibit digital stream by changing a sign of a digitized cosine signal according to bit values of a digital pulse density modulated (PDM) signal received from the SDM; and
add the multibit digital stream to respective samples provided at an output of the first integrator to generate additional samples; and
a first register circuit, coupled to the AU, and to accumulate the additional samples as accumulated demodulation data.

10. The sensing device of claim 9, wherein the CIC filter further comprises:
a second integrator cascaded with the first integrator and to accumulate a plurality of the samples, from the first integrator, of the accumulated demodulation data; and
a comb circuit coupled to the second integrator, the comb circuit comprising:
a register circuit to, while the SDM is coupled to a first sensor of the multiple unit cell sensors, store and multiply the accumulated samples by two to generate accumulated data delayed by a decimation factor; and
a subtractor coupled to the second integrator and the register circuit, the subtractor to subtract the accumulated data from twice the plurality of the samples accumulated by the second integrator at an end of a measurement window.

11. The sensing device of claim 10, wherein the register circuit is a third register circuit, and wherein the CIC filter further comprises:
a summer of the second integrator; and
a second register circuit of the second integrator, wherein the summer is to add an output of the second register circuit to an output of the first register circuit.

12. The sensing device of claim 10, wherein the register circuit is further to decimate the accumulated samples by the decimation factor to generate the accumulated data, and wherein the decimation factor is based on a frequency modulation rate of the SDM.

13. The sensing device of claim 10, wherein the measurement window includes twice a number of samples as the decimation factor.

14. The sensing device of claim 10, wherein the accumulated samples are multiplied by two by shifting corresponding bits one position higher at a register output of the register circuit.

15. The sensing device of claim 10, further comprising:
a multiplexer coupled to the receive electrode; and
control logic coupled to the multiplexer and the CIC filter, the control logic to:
after causing an output of the subtractor to be stored in memory, reset the first and second integrators and the register circuit; and cause the multiplexer to select a second sensor of the multiple unit cell sensors to measure.

16. The sensing device of claim 15, further comprising the memory to store a plurality of measured amplitude bitstreams corresponding to the multiple unit cell sensors.

17. A method of operating an integrated circuit comprising a sigma-delta modulator (SDM) selectively coupled to a receive electrode, a demodulator coupled directly to the SDM, and a cascaded integrator-comb (CIC) filter coupled to the demodulator and comprising cascaded first and second integrators and a single comb circuit, the method comprising:
  generating, by the demodulator, a multibit digital signal by demodulating a digital pulse density modulated (PDM) signal received from the SDM, wherein the demodulating comprises multiplying digitized cosine values with the digital PDM signal;
  accumulating, at the second integrator, using the first and second integrators, a plurality of samples of the multibit digital signal; and
  generating, by the single comb circuit, a measured amplitude bitstream from the accumulated samples.

18. The method of claim 17, further comprising:
  storing, by a register circuit of the CIC filter, while the SDM is coupled to a first sensor, the accumulated samples as decimated accumulation samples delayed by a decimation factor;
  multiplying, by the register circuit, the decimated accumulation samples by two to generate accumulated data; and
  subtracting, by a subtractor of the CIC filter, the accumulated data from twice the plurality of samples accumulated by the second integrator at an end of a measurement window.

19. The method of claim 18, further comprising decimating, by the register circuit, the accumulated samples by the decimation factor to generate the accumulated data, and wherein the decimation factor is based on a frequency modulation rate of the SDM.

20. The method of claim 18, wherein the measurement window includes twice a number of samples as the decimation factor, and the CIC filter is a second order filter.

21. The method of claim 18, wherein the integrated circuit further comprises a multiplexer coupled to the receive electrode and control logic coupled to the multiplexer and the CIC filter, the method further comprising:
  causing, by the control logic, an output of the subtractor to be stored in memory;
  resetting, by the control logic, the first and second integrators and the register circuit; and
  causing, by the control logic, the multiplexer to select a second sensor to measure.

* * * * *